United States Patent Office 2,894,812
Patented July 14, 1959

2,894,812

DISSOLUTION OF PLUTONIUM CONTAINING CARRIER PRECIPITATE BY CARBONATE METATHESIS AND SEPARATION OF SULFIDE IMPURITIES THEREFROM BY SULFIDE PRECIPITATION

Robert B. Duffield, Champaign, Ill., assignor to the United States of America as represented by the United States Atomic Energy Commission No Drawing. Application March 12, 1947
Serial No. 734,219

2 Claims. (Cl. 23—14.5)

This invention relates to a method of separating plutonium from contaminating elements and more specifically relates to a process for providing an acid soluble plutonium compound.

Plutonium refers to element 94 and as used in this specification and claims the word "plutonium" refers to the element or to compounds containing this element unless the context indicates the elemental or metallic form.

Plutonium is a transuranic element and is usually obtained by the reaction of neutrons with uranium; a reaction which is ordinarily carried on in a neutronic reactor of the "pile" type. Natural uranium consisting of $U^{238}$ with 0.7% as much $U^{235}$, or enriched uranium in which the $U^{235}$ content is increased, is introduced into a pile whereupon under proper conditions a chain reaction will take place in the following manner. An atom of $U^{235}$ captures a neutron and fissions to form two elements of lighter weight and two or more neutrons. A neutron is captured by a $U^{238}$ atom to form $U^{239}$. The $U^{239}$ is unstable with a half-life of 23 minutes and decays by beta emission to form $Np^{239}$, which has a half-life of 2.3 days and decays by beta emission to form $U^{239}$.

The fission products formed by the reaction of neutrons with $U^{235}$ comprise a series of light elements with atomic numbers from approximately 35 to 45 and a series of heavier elements with atomic numbers from approximately 51 to 60. The fission of $U^{235}$ is predominantly binary and the fission products produced are usually unstable and decay by beta and gamma emission to elements of higher atomic weight which are stable. The half-lives of the fission products vary from a fraction of a second to many years and the radioactivity produced by their decay is extremely dangerous to personnel handling the neutron irradiated uranium mass. Because of the extreme radioactivity of the fission products it is customary to stop the chain reaction in a neutronic reactor while the proportion of fission products, and consequently of plutonium, to uranium is very small sometimes as low as several parts per million. The mass of uranium as removed from the neutronic reactor therefore contains only small percentages of plutonium, neptunium and fission products. Since neptunium has a half-life of only 2.3 days the majority of neptunium present in the mass may be converted to plutonium simply by aging the mass for a few weeks or months. This aging process also permits the fission products with short half-lives to decay to more stable isotopes. It is impractical, however, to age the mass a sufficient length of time to remove much of the radioactivity caused by the decay of fission products, since a majority of the fission products have half-lives ranging from a few days to a year or so.

In order to obtain plutonium in useful form it is necessary to separate it from the other components of the uranium mass. The most satisfactory method of separation has been found to be the precipitation method. The precipitation method of separating plutonium from non-volatile contaminants normally found in a neutron irradiated mass of uranium is based on the fact that every such contaminant will react with at least one anion to form a compound which has a solubility which substantially differs from that of a compound formed by the reaction of plutonium in one of its valence states with that anion. Since plutonium is usually present in such small concentration, it has been found that it is usually impossible to form a precipitate of plutonium directly and it is therefore necessary to use the carrier technique to separate plutonium from solutions, a technique which consists of co-precipitating plutonium with an inactive compound such as bismuth phosphate or lanthanum fluoride. These carriers are selected so that plutonium is co-precipitated or carried in only one of its oxidation states.

The precipitation method of separation is usually arbitrarily divided into four steps, most of which are cyclic in nature and may be repeated as often as expedient to achieve the result desired. They are: (1) extraction, in which plutonium and some fission products are separated from uranium and the bulk of the fission products; (2) decontamination, in which plutonium is separated from the remaining fission products; (3) concentration, in which the ratio of plutonium to carrier is reduced sufficiently that the plutonium may be precipitated directly from the solution; (4) isolation, in which the plutonium solution is concentrated further and purified.

A common precipitation process is the bismuth phosphate-lanthanum fluoride process. In this process the extraction step is carried out by co-precipitating the plutonium in an oxidation state of $+4$ or less with bismuth phosphate, from a nitric acid solution of the uranium mass. The decontamination step is carried out then by dissolving the bismuth phosphate-plutonium carrier in nitric acid, oxidizing the plutonium to a $+6$ valence state and then forming a carrier precipitate of bismuth phosphate which removes any fission products carried with the plutonium in the extraction step. The plutonium is then reduced and concentrated by co-precipitating the plutonium as a fluoride with lanthanum fluoride. The mixture of lanthanum fluoride and plutonium fluoride thus obtained is very insoluble and cannot be dissolved by ordinary means. This precipitate was formerly dissolved in the laboratory by boiling the precipitate in concentrated perchloric or sulfuric acid which method dried off the fluorine as hydrogen fluoride. It can readily be seen that this method would be totally unsatisfactory for use on an industrial scale since the reaction would have to be carried out in containers such as platinum which would not be corroded by the hydrogen fluoride and fuming sulfuric acid. Following the dissolution of the lanthanum fluoride carrier the plutonium is precipitated directly from solution as a plutonium peroxide.

The principal object of this invention is to provide a method whereby a relatively insoluble plutonium carrier and associated plutonium may be converted to a readily soluble compound.

An additional object of this invention is to provide a step in the bismuth phosphate-lanthanum fluoride process of plutonium separation whereby the lanthanum fluoride-plutonium carrier is dissolved by less corrosive means.

A still further object is to provide a method of removing from a lanthanum fluoride-plutonium carrier such impurities as will interfere with a subsequent plutonium peroxide precipitate.

I have discovered a method whereby these objects may be accomplished. Broadly, the process of my invention comprises dissolving a lanthanum fluoride-plutonium carrier in an alkaline carbonate solution, precipitating a lanthanum hydroxide-plutonium carrier from this solution by the addition of an alkaline hydroxide, freeing this precipitate from fluoride ions by washing and dissolving this lanthanum hydroxide-plutonium carrier precipitate in an acid solution.

It will be readily apparent that the use of the process of this invention in dissolving a plutonium carrier precipitate of lanthanum fluoride has great advantages over the methods formerly used. A plutonium fluoride may be quickly and easily converted to a plutonium compound which is readily soluble in an acid solution. The reagents used in the conversion are inexpensive and easily obtainable. The formation of the highly corrosive and dangerous gaseous hydrogen fluoride is avoided by the use of the process of this invention. Consequently, the platinum vessels needed in the methods formerly used may be dispensed with. The process may be carried out where plutonium is present in very dilute concentrations since the lanthanum hydroxide which is co-precipitated with plutonium hydroxide carries plutonium quantitatively from solution. The volume of plutonium carrier solution is greatly reduced by this operation.

As carried out in plant operation in connection with the bismuth phosphate-lanthanum fluoride process the lanthanum fluoride-plutonium carrier is usually separated from the preceding solution by centrifugation, thus leaving a cake of lanthanum fluoride carrier precipitate in which the plutonium is present in a proportion of about 1 to 5. This lanthanum fluoride cake is usually treated by the addition of a small quantity of 1 N nitric acid to form a slurry which may then be added to a reaction chamber containing the concentrated solution of $K_2CO_3$. The method of introducing into the metathesis chamber the lanthanum fluoride carrier, however, is not at all critical and an equally satisfactory method is to slurry the lanthanum fluoride cake with a large amount of water and introduce the potassium carbonate to this solution as the anhydrous solid. It has been found that the optimum ratio of lanthanum in solution is about 3 g./l. and that should this ratio be increased to 6 g./l. loss of plutonium in the process may increase by as much as 2%. It has also been found that at high ratios of lanthanum to plutonium loss of plutonium is much greater than at the lower ratios. Thus, at a lanthanum to plutonium ratio of 5.2 to 1 the average loss of plutonium is only 0.3% while at a lanthanum to plutonium ratio of 900 to 1 the average loss of plutonium may be as high as 4.2%.

Alkali metal carbonates have been found to be the best reagents for dissolving the fluoride with potassium carbonate probably giving the best results. The concentration of potassium carbonate necessary to dissolve the lanthanum-plutonium fluoride varies somewhat with the conditions under which it is used and also with the amount of impurities present. It has been found that 30% potassium carbonate will dissolve most lanthanum fluoride cakes but 40% has been found to be preferable to insure complete dissolution in the shortest time. It is undesirable to use carbonate above 45% concentration because of the adverse effect it has upon centrifuging of the lanthanum hydroxide precipitate subsequently formed and because this concentration potassium carbonate approaches its limiting solubility. The rate of dissolution of the lanthanum fluoride carrier precipitate in the carbonate solution increases with the temperature and a lanthanum fluoride cake which will dissolve slowly at 25° C. and 45% potassium carbonate will dissolve rapidly and completely at 90° C. The time of reaction is also important in the completeness with which the dissolution of the lanthanum fluoride carrier cake takes place. It has been found, however, that with the concentrations, which we have used, a reaction-digestion time of one hour at 75° C. has given entirely satisfactory results. The time and temperature are inter-dependent so that if the temperature is increased the time may be decreased and vice versa. Thus, two extractions at 60° C. for one-half hour have also been found completely effective. On large scale operation, it has been found desirable to conduct the reaction in a tank which should be equipped with an agitator. However, equally satisfactory results may be obtained when the reaction is carried out in a centrifugation bowl. Agitation is desirable but not necessary.

Once the dissolving of the lanthanum fluoride carrier precipitate has been effected the ions will remain in solution even though cooled to room temperature. No precipitation will occur if the solution is not diluted so that the potassium carbonate concentration falls below 15%. Should precipitation of the lanthanum carbonate occur the precipitate should be redissolved by increasing the carbonate concentration, since the lanthanum carbonate will carry plutonium carbonate from the solution. This lanthanum carbonate, however, is a very inefficient carrier, only removing at best about 50% of plutonium. A lanthanum hydroxide carrier, however, will remove better than 99% under favorable conditions and it is therefore greatly preferred as a carrier of the plutonium from the carbonate solution.

The lanthanum hydroxide carrier may be formed in solution by the addition of an alkali metal hydroxide, such as sodium or potassium. The carbonate solution may be cooled to a temperature of to 25–35° C. before the addition of the hydroxide but the temperature is not critical and satisfactory results at much higher temperatures have been obtained in laboratory experiments. The amount of hydroxide added may vary widely also. An optimum concentration has been found to be between about 1 an 3 N. This may be achieved by adding 10 N KOH until the solution is about 2 or 3 N in potassium hydroxide. It is desirable to use the smallest quantity of potassium hydroxide necessary, since potassium hydroxide normally contains some iron and Fe ions usually interfere with later steps in plutonium separation processes. However, if the concentration of the potassium hydroxide in the carbonate solution is made less than 1 N the plutonium losses tend to rise sharply. The lanthanum hydroxide precipitate containing the plutonium may be separated from the carbonate solution by any of the usual methods such as filtration, decantation or centrifugation. It has been found that the character of the lanthanum hydroxide precipitate is affected somewhat by the manner in which the potassium hydroxide is added to the carbonate solution. Thus, it has been found in plant scale operations that the best results are obtained by a slow addition of 40% potassium hydroxide over a one hour period followed by a one hour digestion at about 20° to 35° C. Following the separation of the lanthanum hydroxide carrier the precipitate should be washed in order to free it of all fluoride ions. If the precipitate is not washed the fluoride ions which remain may form a lanthanum fluoride precipitate upon acidification of the precipitate. The number of washes necessary are dependent upon the method and apparatus by which the metathesis is carried out, but it has been found that in large scale operations at relatively high plutonium to lanthanum ratios a single thorough wash carried out in the centrifuge bowl is sufficient. It has been found that there is some possibility of peptization of the hydroxide precipitate if a water wash is used. Should this occur peptization may be broken up by heating the supernatant solution or by adding lanthanum ions to the solution and re-centrifuging. However, it has been found that peptization may be avoided by the use of a dilute potassium hydroxide wash. Concentration of potassium hydroxide may vary at least from one to five percent with two percent potassium hydroxide giving in nearly all cases a satisfactory result.

The lanthanum hydroxide-plutonium hydroxide cake obtained by the process of this invention is readily soluble in a solution of a strong inorganic acid which would form water soluble salts with lanthanum and plutonium, such as hydrobromic, hydrochloric, nitric, sulfuric or a mixture of the last two. Where the process of this invention is followed by an isolation step dependent upon the peroxide precipitation of plutonium, it has been found desirable to dissolve the hydroxide cake in a nitric acid solution since the nitrate ions interfere least with subsequent steps in a normal separation process. The quantity of nitric acid used should be sufficient to neutralize the 2% potassium hydroxide heel and to convert the lanthanum hydroxide and plutonium hydroxide to the corresponding nitrates. If the nitric acid concentration is below 0.5 N, there is danger of hydrolysis or formation of the polymerized form of plutonium. The hydroxides may be dissolved by the addition of concentrated acid such as $HNO_3$ (60%) to the precipitate and centrifuge heel and following dissolution of the hydroxide the solution diluted to the desired $HNO_3$ concentration. The use of nitric acid has been found particularly desirable in that if any minute portion of lanthanum fluoride-plutonium fluoride has not been metathesized by the preceding operations it will probably be in such low concentration that it will dissolve in the nitric acid solution.

The use of the process of this invention may be illustrated by the following example showing this process as used on a laboratory scale.

Example I

A 250 mg. sample of lanthanum (as lanthanum fluoride) containing 15 micrograms of plutonium was dissolved in two additions of 45% $K_2CO_3$ using 6 cc. each time and heating for one hour at 50° C. 10 N KOH was then added to make the solution 2 N in KOH. The solution was digested for one hour and the precipitate of lanthanum hydroxide then separated from the solution by centrifugation. Analysis of the supernatant liquid disclosed that it contained 0.3% of the plutonium. The undissolved residue from the two $K_2CO_3$ treatments contained 0.05% of the plutonium. On dissolving the $La(OH)_3$ with $HNO_3$ no residue remained and analysis of the acid solution disclosed plutonium recovery of 99.6%.

The use of the process of this invention in large scale operation may be illustrated by the following example.

Example II

A lanthanum fluoride carrier precipitate comprising 2.48 lbs. of lanthanum fluoride and 250 g. of plutonium is slurried with 10 gals. of 1 N $HNO_3$ and the slurry introduced into a centrifuge bowl. 110 gals. of 43% $K_2CO_3$ is then added to the bowl in successive proportions via sprays, slowly at first until the $HNO_3$ is neutralized. The neutralization requires about 1% of the $K_2CO_3$. The slurry is then jetted to a tank with provisions for agitating and heating. The slurry is heated to 75° C. and agitated for one hour. The $K_2CO_3$ solution is then cooled to 35° C. and made 15% in potassium hydroxide by gradual addition of 40% KOH over a period of one hour and the slurry is then agitated for one hour. A hydroxide precipitate is separated in a 26-inch centrifuge operated at 1800 r.p.m. with the maximum through-put (12–20 lbs./min.) giving a reasonably clear effluent. The product cake is slurried from the bowl and washed with a 2% KOH solution. The lanthanum hydroxide carrier precipitate is then dissolved in 60% nitric acid and the nitric acid solution diluted to form a 1 N nitric acid solution.

Where a precipitation of plutonium peroxide is used as an integral part of a concentration step of a separation process it has been found that certain contaminating ions, particularly iron and zirconium, will interfere greatly with this step. Thus, where a plutonium peroxide precipitate is formed at 60° C., a concentration of Fe ions of greater than $1 \times 10^{-3}$ M will ordinarily prevent effective precipitation. The mechanism of the action of Fe is probably one of catalytic decomposition of $H_2O_2$ and the solubility of plutonium peroxide is thus greatly decreased. Therefore, in order to concentrate plutonium effectively by the peroxide precipitation method, it is very desirable that the Fe ions in the plutonium solution be reduced to a minimum. I have discovered that iron, zirconium and other impurities may be greatly reduced by a modification of the process of this invention. This modification comprises the forming and separating of a sulfide precipitate from the carbonate solution following the dissolution of the lanthanum fluoride carrier precipitate. This precipitation step will remove iron, zirconium and any other impurities which form insoluble sulfides. In order to carry out this modification the lanthanum fluoride carrier is dissolved in the potassium carbonate solution as described above. Following the dissolution a soluble sulfide salt such as ammonium sulfide or ammonium polysulfide is introduced into the solution. The concentration level of the ammonium sulfide will vary somewhat depending upon the amount of impurities present. In normal plant operation the concentration necessary can be easily determined by tests of the solution. It has been found that the concentration of 0.05 M to 0.1 M will give satisfactory results with the percentages of impurities normally encountered. It has been found that the slow addition of the sulfide or the addition of the sulfide in several small parts gives a sulfide precipitate with better centrifuging characteristics than that obtained by a rapid addition of the sulfide. Good coagulation of the sulfide is obtained by adding ammonium sulfide in several parts and digesting for approximately one hour at about 75° C. The sulfide precipitate may be separated by centrifugation, by filtration or by decantation depending somewhat upon the quantity of sulfide precipitate present. If the sulfide precipitate is separated by filtration, it may be desirable to use a filter aid, such as finely divided asbestos. It has been found that by the use of the sulfide precipitation step the iron content may be reduced by a factor of two and that the average concentration of iron following precipitation and methathesis will be about $3 \times 10^{-3}$ M. This modification of my process may be illustrated by the following example.

Example III

The dissolution of the lanthanum fluoride-plutonium carrier is carried out as described in Example 2 above. Following dissolution the slurry, which was at 75° C. to dissolve the lanthanum fluoride, is made 0.5 M in $(NH_4)_2S$ over a period of 45 minutes following 15 minutes of digestion. The mixture is cooled to 35° C. and the sulfide precipitate is separated by jetting the slurry to a 26-inch centrifuge operated at 1800 r.p.m. Following centrifugation the bowl is skimmed to a three-gallon heel and the precipitate slurried in the bowl with nine gallons of 20% $K_2CO_3$–0.05 N $(NH_4)_2S$. The washing operation is repeated with a fresh volume of 20% $K_2CO_3$–0.05 M $(NH_4)_2S$. The skimmings, washes and original effluent are jetted from the catch tank back into the metathesizer. The $K_2CO_3$ solution is then made 15% in KOH by gradual addition of 81.3 gals of 40% KOH over a period of one hour at 25° C. and the slurry of lanthanum hydroxide carrier thus formed then agitated for one hour at the same temperature. The hydroxide precipitate is then separated in a 26-inch centrifuge operated at 1800 r.p.m. and the lanthanum hydroxide precipitate washed and dissolved in a nitric acid solution as described in Example 2.

While there have been described certain embodiments of my invention, it is to be understood that it is capable of many modifications. Changes, therefore, may be made without departing from the spirit and scope of the invention as described in the appended claims.

What is claimed is:

1. In a process for recovering plutonium from foreign products wherein a carrier precipitate of lanthanum fluoride containing plutonium is obtained, the steps which comprise dissolving said lanthanum fluoride-plutonium carrier in an alkali metal carbonate solution, then adding a soluble sulfide to the solution to form a precipitate of the impurities therein contained which form insoluble sulfides, separating said sulfide precipitate, then adding a solution of an alkali metal hydroxide to the supernatant liquid to precipitate a lanthanum hydroxide-plutonium carrier, separating the resulting hydroxide precipitate, washing the precipitate, then dissolving said hydroxide precipitate in a solution of a strong inorganic acid which will form water-soluble salts with lanthanum and plutonium.

2. In a process for recovering plutonium from foreign products wherein a carrier precipitate of lanthanum fluoride containing plutonium is obtained, the steps which comprise dissolving said lanthanum fluoride carrier in an approximately 40% $K_2CO_3$ solution then adding $(NH_4)_2S$ to the solution to form an insoluble precipitate with sulfide-forming impurities therein contained, separating said precipitate, then adding a solution of potassium hydroxide to the carbonate solution to precipitate a lanthanum hydroxide-plutonium carrier, separating the resulting hydroxide precipitate, washing the precipitate with a dilute aqueous potassium hydroxide solution, and dissolving said hydroxide precipitate in a nitric acid solution to form a solution in which the nitric acid is present in a concentration not less than 0.5 N.

References Cited in the file of this patent

UNITED STATES PATENTS

| | | |
|---|---|---|
| 2,768,871 | Brown et al. | Oct. 30, 1956 |
| 2,785,951 | Thompson et al. | Mar. 19, 1957 |